(12) United States Patent
Lu et al.

(10) Patent No.: US 10,488,084 B2
(45) Date of Patent: Nov. 26, 2019

(54) VEHICLE REFRIGERATION EQUIPMENT HAVING A VAPOR CYCLE SYSTEM

(71) Applicant: B/E AEROSPACE, INC., Wellington, FL (US)

(72) Inventors: Qiao Lu, Placentia, CA (US); William J. Godecker, Irvine, CA (US); Richard Rigney, Long Beach, CA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 80 days.

(21) Appl. No.: 15/134,020

(22) Filed: Apr. 20, 2016

(65) Prior Publication Data

US 2016/0231030 A1 Aug. 11, 2016

Related U.S. Application Data

(62) Division of application No. 13/849,161, filed on Mar. 22, 2013, now abandoned.

(Continued)

(51) Int. Cl.
*B64D 13/08* (2006.01)
*F25B 13/00* (2006.01)
(Continued)

(52) U.S. Cl.
CPC ............. *F25B 13/00* (2013.01); *B64D 13/08* (2013.01); *F25B 41/00* (2013.01); *F25D 17/067* (2013.01);
(Continued)

(58) Field of Classification Search
CPC ............ F25B 2600/11; F25B 2600/112; F25B 2313/0294; F25B 2313/0293; F25B 2500/26; F25D 19/00; B64D 2013/0674
See application file for complete search history.

(56) References Cited

U.S. PATENT DOCUMENTS 3,703,815 A 11/1972 Welch
3,871,188 A 3/1975 Vold et al.
(Continued)

FOREIGN PATENT DOCUMENTS

CA 2753273 C 5/2014
CN 1795358 A 6/2006
(Continued)

OTHER PUBLICATIONS

International Search Report and Written Opinion issued in related application PCT/US2013/033565, Jun. 17, 2013, 9 pages.
(Continued)

*Primary Examiner* — Frantz F Jules
*Assistant Examiner* — Lionel Nouketcha
(74) *Attorney, Agent, or Firm* — Suiter Swantz pc llo (57) ABSTRACT

According to an embodiment, a refrigeration system that cools a compartment includes a compressor, a condenser, a condenser fan, a condenser fan motor, an evaporator, an evaporator fan, an evaporator fan motor, and tubing adapted to transport refrigerant through the refrigeration system in a circulation order from the compressor to the condenser to the evaporator and back to the compressor again. The evaporator fan may be positioned in an air inlet path to the evaporator. The evaporator fan motor may be outside a chilled air circuit of the evaporator.

8 Claims, 5 Drawing Sheets

Related U.S. Application Data (60) Provisional application No. 61/614,199, filed on Mar. 22, 2012.

(51) Int. Cl.
*F25B 41/00* (2006.01)
*F25D 17/06* (2006.01)
*F25D 19/00* (2006.01)
*B64D 13/06* (2006.01)

(52) U.S. Cl.
CPC ...... *F25D 19/00* (2013.01); *B64D 2013/0629* (2013.01); *B64D 2013/0674* (2013.01); *F25B 2313/0293* (2013.01); *F25B 2313/0294* (2013.01); *F25B 2700/151* (2013.01); *Y02T 50/56* (2013.01)

(56) References Cited

U.S. PATENT DOCUMENTS

| | | | |
|---|---|---|---|
| 3,908,749 | A | 9/1975 | Williams |
| 4,067,206 | A | 1/1978 | Smith |
| RE30,623 | E | 5/1981 | Schulz et al. |
| 4,776,182 | A | 10/1988 | Gidseg |
| 4,800,734 | A | 1/1989 | Sauber et al. |
| 5,513,500 | A | 5/1996 | Fischer et al. |
| 5,918,474 | A * | 7/1999 | Khanpara ............ F25B 49/027 62/179 |
| 5,950,446 | A * | 9/1999 | Tromblee ............ F24F 1/027 165/122 |
| 5,953,929 | A | 9/1999 | Bauman et al. |
| 5,967,748 | A * | 10/1999 | Jang ............ F04D 29/522 415/211.1 |
| 6,389,822 | B1 | 5/2002 | Schanin |
| 6,438,978 | B1 * | 8/2002 | Bessler ............ F25B 5/04 62/179 |
| 6,543,244 | B1 | 4/2003 | Amr |
| 6,587,642 | B1 * | 7/2003 | King ............ F04D 25/088 392/364 |
| 6,832,504 | B1 | 12/2004 | Birkmann |
| 6,845,627 | B1 | 1/2005 | Buck |
| 6,883,339 | B2 | 4/2005 | Park et al. |
| 7,231,778 | B2 * | 6/2007 | Rigney ............ B60H 1/00014 62/407 |
| 7,322,799 | B2 | 1/2008 | Robertson et al. |
| 7,661,459 | B2 | 2/2010 | Wesley et al. |
| 7,721,564 | B2 | 5/2010 | Rizzo |
| 7,765,818 | B2 | 8/2010 | Buck |
| 8,056,349 | B2 | 11/2011 | Oswald |
| 8,171,745 | B2 | 5/2012 | Schroder |
| 2002/0139134 | A1 * | 10/2002 | Schanin ............ F25D 29/00 62/229 |
| 2005/0095138 | A1 * | 5/2005 | Robertson ............ F04D 25/06 417/16 |
| 2008/0120187 | A1 | 5/2008 | Wesley et al. |
| 2009/0044547 | A1 * | 2/2009 | Oswald ............ F25D 11/003 62/89 |
| 2009/0301120 | A1 | 12/2009 | Godecker et al. |
| 2010/0224726 | A1 * | 9/2010 | Lu ............ F25D 17/06 244/118.5 |
| 2010/0281892 | A1 | 11/2010 | Schroder |
| 2011/0011115 | A1 | 1/2011 | Bushnell |
| 2011/0120145 | A1 * | 5/2011 | Akei ............ F25B 1/00 62/3.2 |
| 2012/0006593 | A1 * | 1/2012 | Tillotson ............ H05K 9/005 174/377 |
| 2012/0011885 | A1 * | 1/2012 | Cho ............ F25D 17/065 62/426 |
| 2015/0266353 | A1 | 9/2015 | Lu et al. |

FOREIGN PATENT DOCUMENTS

| | | |
|---|---|---|
| CN | 1977134 A | 6/2007 |
| CN | 101021351 A | 8/2007 |
| CN | 101291821 A | 10/2008 |
| DE | 4340317 C2 | 3/1996 |
| EP | 2174082 A1 | 4/2010 |
| JP | S52150845 U | 11/1977 |
| JP | S58165554 U | 11/1983 |
| JP | 03233262 A | 10/1991 |
| JP | 10226225 A | 8/1998 |
| JP | 2001-355953 A | 12/2001 |
| JP | 2002-327951 A | 11/2002 |
| JP | 2002-357384 A | 12/2002 |
| JP | 2005-134001 A | 5/2005 |
| JP | 2005-308369 A | 11/2005 |
| JP | 2006-214614 A | 8/2006 |
| JP | 3820664 B2 | 9/2006 |
| JP | 4291730 B2 | 7/2009 |
| JP | 2009-539059 A | 11/2009 |
| JP | 2010-514603 A | 5/2010 |
| JP | 2010537149 A | 12/2010 |
| JP | 2012-519624 A | 8/2012 |
| WO | 0190668 A1 | 11/2001 |
| WO | 2006101513 A1 | 9/2006 |
| WO | 2009023619 A1 | 2/2009 |
| WO | 200914932 A1 | 12/2009 |
| WO | 2017176682 A1 | 10/2017 |

OTHER PUBLICATIONS

Office Action issued in related application CA 2865446, Aug. 11, 2015, 3 pages.
Office Action issued in related application CN 201380015509.7, Sep. 28, 2015, 18 pages (with translation).
Office Action issued in related application JP 2015-501937, Oct. 20, 2015, 11 pages (with translation).
Supplementary Search Report and opinion issued in related application EP 13763584.3, dated Mar. 7, 2016, 14 pages.
Second Office Action issued in related application CN 201380015509.7, May 5, 2016, 15 pages (with translation).
Final Office Action issued in related application JP 2015-501937, Jun. 15, 2016, 9 pages (with English translation).
Amendment and Response to Second Office Action filed in related application CN 201380015509.7, Jul. 18, 2016, 9 pages (with translation of claim amendments and remarks).
Third Office Action issued in related application CN 201380015509.7, Sep. 2, 2016, 12 pages (with translation).
Fourth Office Action issued in related application CN 201380015509.7, Jan. 3, 2017, with partial English language translation, 8 pages.
Office Action issued in related application JP 2016-173252, Jul. 4, 2017, with English language translation, 9 pages.
Examination Report issued in related application EP 13763584.3, Jun. 6, 2017, 6 pages.
Office Action dated Mar. 2, 2018 for Japanese Application No. 2016-173252.
International Preliminary Report on Patentability dated Sep. 23, 2014 for PCT/US2013/033565.
Office Action dated Jan. 3, 2019 for CN Patent Application No. 201710199740.6.
Examination Report dated Oct. 15, 2018 for EP Patent Application No. 13763584.3.

* cited by examiner

VEHICLE REFRIGERATION EQUIPMENT HAVING A VAPOR CYCLE SYSTEM

CROSS-REFERENCE TO RELATED PATENT APPLICATIONS

This patent application is a divisional of U.S. patent application Ser. No. 13/849,161, filed Mar. 22, 2013, which claims the benefit of U.S. Provisional Patent Application No. 61/614,199, filed Mar. 22, 2012. Both of the above-referenced applications are herein incorporated by reference in their entirety.

FIELD

Embodiments relate to refrigeration equipment. More specifically, embodiments relate to equipment for providing and re-circulating chilled air to an aircraft galley food service system to maintain the temperature of galley food and beverages stored in a compartment at a desired food storage temperature.

Conventional refrigeration units for chilling food and beverages used in vehicles such as aircraft and other galley food service systems include vapor cycle systems that use a fluid refrigerant to chill air for circulation in a compartment that stores food and beverages. In general, vapor cycle systems for refrigeration units are designed to maintain set temperatures as required for steady state heat loads. If refrigeration units for chilling food and beverages used in vehicles could be made more energy efficient an important contribution to the art would be achieved.

SUMMARY

According to an embodiment, a refrigeration system that cools a compartment includes a compressor, a condenser, a condenser fan, a condenser fan motor, an evaporator, an evaporator fan, an evaporator fan motor, and tubing adapted to transport refrigerant through the refrigeration system in a circulation order from the compressor to the condenser to the evaporator and back to the compressor again. The evaporator fan may be positioned in an air inlet path to the evaporator. The evaporator fan motor may be outside a chilled air circuit of the evaporator.

BRIEF DESCRIPTION OF THE DRAWINGS

Exemplary embodiments are shown in the attached drawings. In the drawings.

DETAILED DESCRIPTION

While the following embodiments are described with reference to refrigeration equipment for cooling compartments in an aircraft galley, this should not be construed as limiting. Embodiments may also be used for cooling compartments in other vehicles such as ships, buses, trucks, automobiles, trains, recreational vehicles, and spacecraft, or in terrestrial settings such as offices, stores, homes, cabins, etc. Embodiments may also include refrigerator compartments.

Figure 1:
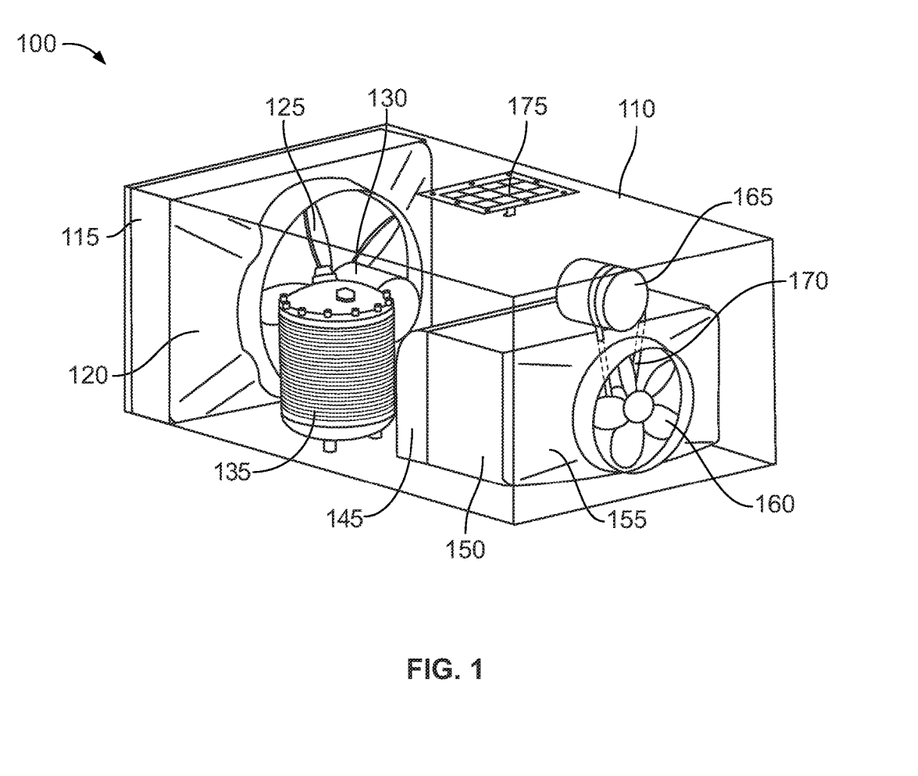
FIG. 1 illustrates a perspective view of components of a refrigeration equipment, according to an embodiment.

FIG. 1 illustrates a perspective view of components of a refrigeration equipment 100, according to an embodiment. The refrigeration equipment 100 includes an enclosure 110 that may be operatively coupled with a compartment such as a food and beverage trolley or food cart (not shown) or with a galley refrigeration equipment to chill food and beverages stored within the food and beverage trolley, food cart, or galley refrigeration equipment. The enclosure 110 includes an air-cooled condenser 115. The condenser 115 is operable to condense fluid refrigerant in a vapor cycle system of the refrigeration equipment 100. The fluid refrigerant condensed by the condenser 115 is received from a compressor 135. The condenser 115 is cooled by airflow through the condenser 115 provided by a condenser fan 125 that is driven by a condenser fan motor 130. The airflow through the condenser 115 provided by the condenser fan 125 is guided and directed by a condenser fan shroud 120 in order to ensure efficient cooling of the condenser 115. The airflow through the condenser 115 provided by the condenser fan 125 also provides an airflow through a refrigeration equipment air outlet 175. The condenser fan 125 may pull airflow through the condenser 115, the condenser fan shroud 120, the interior of the enclosure 110, and to exhaust it out the refrigeration equipment air outlet 175. The airflow provided by the condenser fan 125 may also be operable to cool interior components of the refrigeration equipment 100, including the compressor 135, condenser fan motor 130, and evaporator fan motor 165.

An evaporator 150 receives fluid refrigerant from the condenser 115 and uses the fluid refrigerant to chill air provided by an evaporator fan 160 that is guided by an evaporator fan shroud 155 to pass through the evaporator 150. Once the fluid refrigerant exits the evaporator 150, the fluid refrigerant returns to the compressor 135 to be compressed again and continue flowing through the vapor cycle system.

The evaporator fan 160 is driven by an evaporator fan motor 165 via an evaporator fan drive belt 170. Once the chilled air exits the evaporator 150, the chilled air is directed to its destination chilled or refrigerated compartment by evaporator air ducting 145. The chilled air may form a chilled air circuit by passing through the evaporator fan 160, the evaporator fan shroud 155, evaporator 150, the evaporator air ducting 145, various other ducting and elements to which the evaporator air ducting 145 provides the chilled air, and then returning to the evaporator fan 160.

Figure 2:
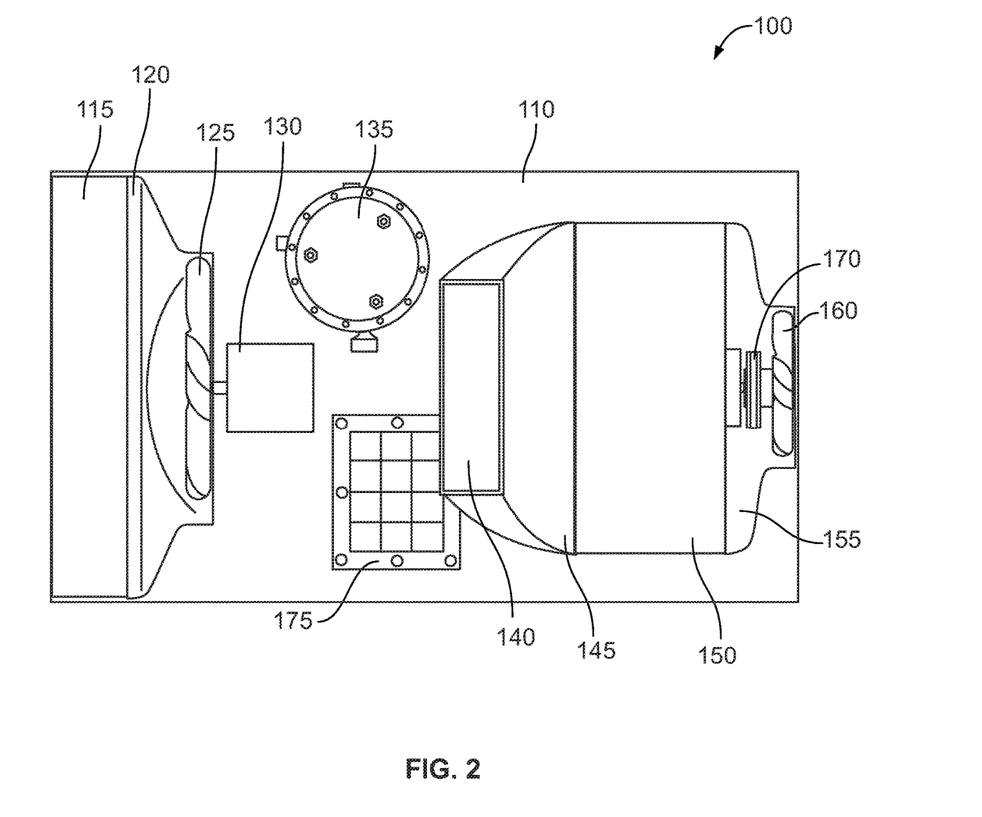
FIG. 2 illustrates a bottom plan view of components of the refrigeration equipment of FIG. 1, according to an embodiment.

FIG. 2 illustrates a bottom plan view of the refrigeration equipment 100 of FIG. 1 with the base of the enclosure removed to enable viewing of the components of the equipment. Components of the refrigeration equipment 100 illustrated in FIG. 2 with like reference characters as components of the refrigeration equipment 100 illustrated in FIG. 1 are the same as those illustrated in FIG. 1. In addition, FIG. 2 illustrates that chilled air exits the evaporator air ducting through an evaporator fan outlet 140 on a side of the refrigeration equipment 100 opposite that of the refrigeration equipment air outlet 175. The chilled air may be directed into an interior of a galley food and beverage trolley, a food cart, a refrigeration equipment, or other area or compartment that is intended to be cooled by the chilled air supplied from the refrigeration equipment 100. By positioning the evaporator fan outlet 140 on a bottom of the enclosure 110 when the refrigeration equipment 100 is coupled with an aircraft galley air re-circulating system, the pressure drop in the aircraft galley air re-circulating system may be reduced.

As illustrated in FIGS. 1 and 2, the evaporator fan 160 is positioned upstream of the evaporator 150 as a chilled air moving device. In other words, the evaporator fan 160 is positioned at the inlet of the evaporator 150, as opposed to being positioned at the outlet so that most of the heat produced by the fan blades as they move through the air is dissipated before the airstream produced by the evaporator fan enters the intake to the evaporator. This results in the evaporating temperature of the refrigerant in the evaporator 150 being increased, thus increasing the efficiency of the refrigeration system. The power consumption of the refrigeration system may be increased by using this arrangement, for example, by approximately 2%.

In addition, the evaporator fan motor 165 is positioned on the side of the enclosure 110 in which the airflow from the condenser fan 125 passes before leaving the enclosure 110 via the refrigeration equipment air outlet 175. The evaporator fan motor 165 is operationally coupled with the evaporator fan 160 via evaporator fan drive belt 170 so that the evaporator fan motor is outside the evaporator and spaced from the evaporator intake. As a result, the heat that the motor produces is dissipated before the airstream produced by the evaporator fan enters the intake to the evaporator. In various embodiments, the evaporator fan motor 165 may also or alternatively be coupled with the evaporator fan 160 via extension drive shafts or a gear drive so long as it is separate from as well as spaced from the evaporator intake and outside the evaporator. For example, the motor may be spaced at least 15 cm from the fan and it may be spaced, for example, 30 cm or more from the fan. As a result, heat from the evaporator fan motor 165 that reaches the evaporator 150 is reduced compared to having the evaporator fan motor 165 directly attached to the evaporator fan 160. This configuration results in a decrease in the required compressor displacement, for example, by approximately 14%, so that overall power consumption can be reduced, for example, an additional 8%.

Having separate motors to drive the evaporator fan 160 and the condenser fan 125 provides a number of important operational advantages. First, during start-up of the refrigeration equipment 100, particularly in high ambient temperature conditions, evaporator 150 will be warm. The start-up of the evaporator fan motor 165 relative to the start-up of the condenser fan motor 130 will therefore be delayed to prevent recirculation of warm air to food carts or other cooling or refrigeration compartments that receive air from the evaporator fan outlet 140. Meanwhile the condenser fan motor 130 will run in order to provide cooling to the condenser 115. And, the condenser fan motor 130 will continue to run for a period of time after the compressor is turned off in order to provide compressor over-heat protection. However, in the present refrigeration equipment 100, when the compressor is not operating, the evaporator fan motor 165 will be turned off while the condenser fan motor 130 will continue to operate and the hot vapor and warm liquid refrigerant migrates back to the evaporator 150 due to the pressure difference between the condenser 115 and evaporator 150. In this way, warm air will not be blown from the evaporator into the areas intended to be chilled. Thus, the performance of the refrigeration equipment 100 may be optimized by independently adjusting and controlling air flow through the evaporator 150 and the condenser 115.

Table 1 illustrates the difference in performance between prior art refrigeration equipment in which the evaporator fan is positioned at the air outlet side of the evaporator (case 1) and two embodiments in which the evaporator fan is positioned at the air inlet side of the evaporator 150 (case 2 and case 3). All three cases involve refrigeration equipments having a same cooling capacity of 7,000 BTU/h. In case 1, 50% of the heat from the evaporator fan motor transfers to the chilled air circuit. This reduces the effectiveness and efficiency of the refrigeration equipment. The case 2 embodiment improves upon the prior refrigeration equipment of case 1. However, in case 2, 50% of the heat from the evaporator fan motor still transfers to the chilled air circuit. The case 3 embodiment further improves upon the prior refrigeration equipment of case 1, and only 10% of the heat from the evaporator fan motor transfers to the chilled air circuit since the evaporator fan motor is installed outside of the chilled air circuit.

Both cases 2 and 3 provide better performance than case 1. For example, the refrigeration equipment of cases 2 and 3 both have higher evaporating pressure (Table 1 Row 22), smaller compressors (Table 1 Row 18), lower power consumption for the compressor and refrigeration equipment (Table 1 Rows 37, 40), smaller evaporator and condenser sizes (Table 1 Rows 24 and 30), less heat rejection to the aircraft environment (Table 1 Row 31), and higher efficiency or Coefficient of Performance (COP) (Table 1 Row 38).

TABLE 1

Comparison of performance of prior refrigeration equipment (case 1) with two different improved embodiments (cases 2 and 3).

| ROW | PERFORMANCE FACTOR | IP UNIT | CASE 1 | CASE 2 | CASE 3 | SI UNIT | CASE 1 | CASE 2 | CASE 3 |
|---|---|---|---|---|---|---|---|---|---|
| 1 | | | Refrigeration equipment | Refrigeration equipment | Refrigeration equipment | | Refrigeration equipment | Refrigeration equipment | Refrigeration equipment |
| 2 | Location of Evaporator Fan (Blower) | | Air Outlet | Air Inlet | Air Inlet | | Air Outlet | Air Inlet | Air Inlet |
| 3 | Location of Evaporator Fan Motor | | Partially in Air Outlet | Partially in Air Inlet | Outside Chilled Air Circuit | | Partially in Air Outlet | Partially in Air Inlet | Outside Chilled Air Circuit |
| 4 | Refrigeration equipment rating conditions | | 7000 Btu at 4° C. | 7000 Btu at 4° C. | 7000 Btu at 4° C. | | 7000 Btu at 4° C. | 7000 Btu at 4° C. | 7000 Btu at 4° C. |
| 5 | Air-Cooling Processes | | | | | | | | |

TABLE 1-continued

Comparison of performance of prior refrigeration equipment (case 1) with two different improved embodiments (cases 2 and 3).

| ROW | PERFORMANCE FACTOR | IP UNIT | CASE 1 | CASE 2 | CASE 3 | SI UNIT | CASE 1 | CASE 2 | CASE 3 |
|---|---|---|---|---|---|---|---|---|---|
| 6 | Ambient Temperature | °F. | 85 | 85 | 85 | °C. | 29.4 | 29.4 | 29.4 |
| 7 | Refrigeration equipment return air temperature (T1) | °F. | 39.2 | 39.2 | 39.2 | °C. | 4.0 | 4.0 | 4.0 |
| 8 | Evaporator inlet air temperature (T2) | °F. | 39.2 | 40.2 | 39.4 | °C. | 4.0 | 4.6 | 4.1 |
| 9 | Evaporator outlet air temperature (T3) | °F. | 29 | 30 | 30 | °C. | −1.7 | −1.1 | −1.1 |
| 10 | Refrigeration equipment supply air temperature (T4) | °F. | 30 | 30 | 30 | °C. | −1.1 | −1.1 | −1.1 |
| 11 | Moisture content | % | 93.4 | 98 | 98 | % | 93.4 | 98.0 | 98.0 |
| 12 | Evaporator air flow | CFM | 660 | 660 | 660 | Liter/Sec | 311.5 | 311.5 | 311.5 |
| 13 | Evaporator fan pressure rise | in H2O | 2.5 | 2.5 | 2.5 | Mbar | 6.2 | 6.2 | 6.2 |
| 14 | Evaporator fan efficiency | % | 42 | 42 | 42 | % | 42.0 | 42.0 | 42.0 |
| 15 | Fan motor heat to the evaporator | % | 50 | 50 | 10 | % | 50.0 | 50.0 | 10.0 |
| 16 | Cooling capacity of refrigeration equipment | BTU/h | 7000 | 7000 | 7000 | W | 2050.1 | 2050.1 | 2050.1 |
| 17 | Refrigeration System | | | | | | | | |
| 18 | Compressor displacement | Cub in/Rev | 1.378 | 1.318 | 1.18 | Cub cm/Rev | 22.58 | 21.60 | 19.34 |
| 19 | Compression ratio | | 4.9 | 4.7 | 4.5 | | 4.9 | 4.7 | 4.5 |
| 20 | Compressor adiabtic efficiency | % | 60 | 60 | 60 | % | 60.0 | 60.0 | 60.0 |
| 21 | Compressor motor efficiency | % | 50 | 50 | 50 | % | 50.0 | 50.0 | 50.0 |
| 22 | Evaporating pressure | Psia | 36.1 | 37.3 | 37.3 | Bar | 2.5 | 2.6 | 2.6 |
| 23 | Evaporating temperature | °F. | 24.1 | 25.6 | 25.6 | °C. | −4.4 | −3.6 | −3.6 |
| 24 | Cooling capacity | BTU/h | 7787 | 7787 | 7157 | W | 2280.6 | 2280.6 | 2096.1 |
| 25 | Condensing pressure | Psia | 177.1 | 176.4 | 169.1 | Bar | 12.2 | 12.2 | 11.7 |
| 26 | Condensing temperature | °F. | 116.3 | 116.3 | 113.3 | °C. | 46.8 | 46.8 | 45.2 |
| 27 | Condenser air flow | CFM | 450 | 450 | 450 | Liter/Sec | 212.4 | 212.4 | 212.4 |
| 28 | Condenser fan pressure rise | in H2O | 1.5 | 1.5 | 1.5 | mbar | 3.7 | 3.7 | 3.7 |
| 29 | Condenser fan efficiency | % | 42 | 42 | 42 | % | 42.0 | 42.0 | 42.0 |
| 30 | Condenser heat rejection | BTU/h | 11929 | 11820 | 10708 | W | 3493.7 | 3461.8 | 3136.1 |
| 31 | Heat rejection from refrigeration equipment | BTU/h | 15954 | 15772 | 14984 | W | 4672.5 | 4619.2 | 4388.4 |
| 32 | Refrigeration equipment discharge air temperature | °F. | 120.9 | 120.5 | 118.7 | °C. | 49.4 | 49.2 | 48.2 |
| 33 | Power and COP | | | | | | | | |
| 34 | Evaporator Fan | W | 461.3 | 461.3 | 461.3 | W | 461.3 | 461.3 | 461.3 |
| 35 | Condenser Fan | W | 188.8 | 188.8 | 188.8 | W | 188.8 | 188.8 | 188.8 |
| 36 | Compressor | W | 1900 | 1847 | 1623 | W | 1900 | 1847 | 1623 |
| 37 | Total Power Consumption | W | 2550.1 | 2497.1 | 2273.1 | W | 2550.1 | 2497.1 | 2273.1 |
| 38 | COP | | 0.80 | 0.82 | 0.90 | | 0.80 | 0.82 | 0.90 |
| 39 | Power factor | | 0.8 | 0.8 | 0.8 | | 0.8 | 0.8 | 0.8 |
| 40 | Apparent power | kVA | 3.19 | 3.12 | 2.84 | kVA | 3.19 | 3.12 | 2.84 |

Figure 3:
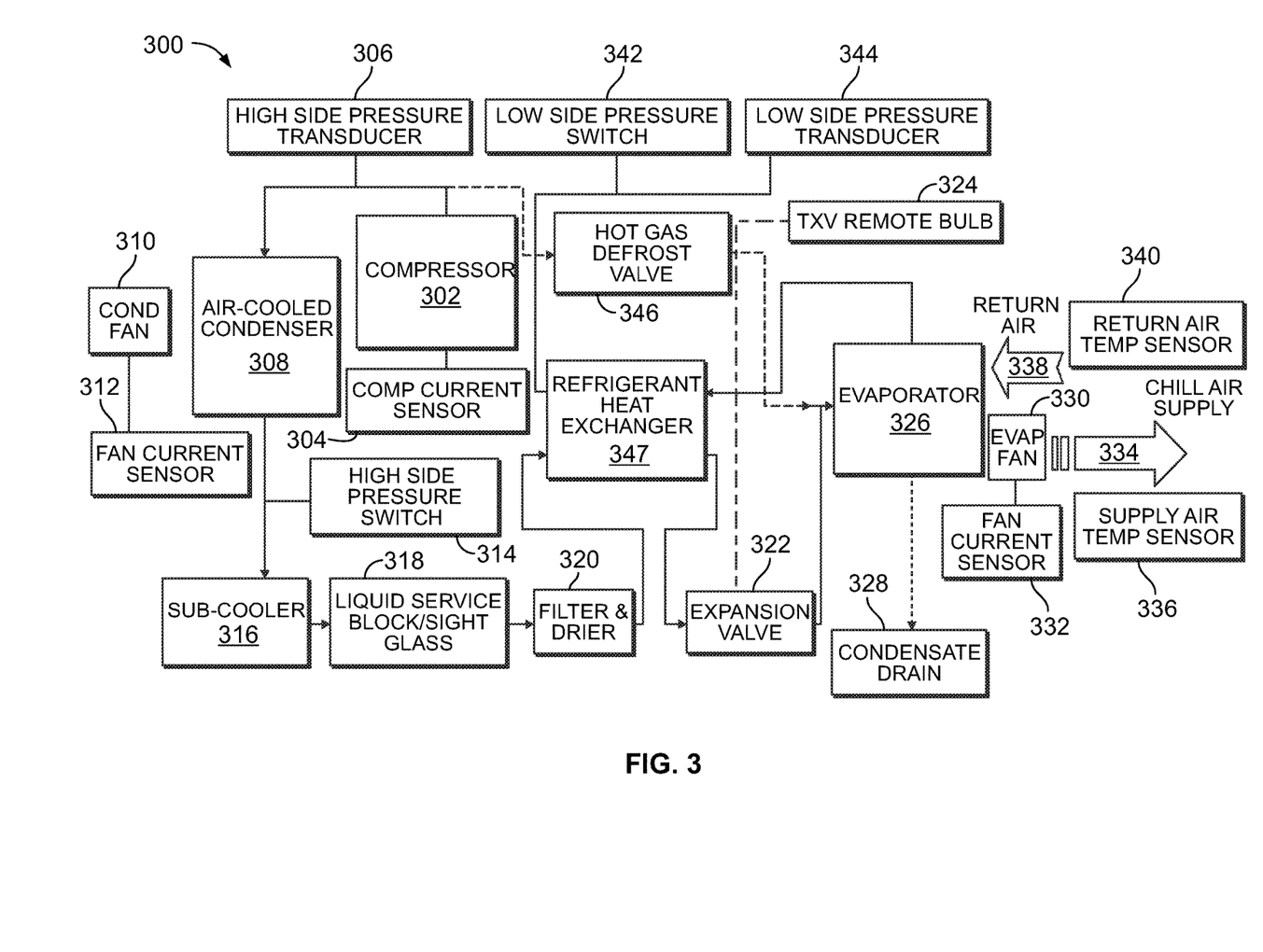
FIG. 3 is a schematic diagram of a vapor cycle refrigeration system, according to an embodiment.

FIG. 3 is a schematic diagram of a vapor cycle refrigeration system 300, which may be an embodiment of the refrigeration equipment 100. The refrigeration system 300 includes a vapor cycle system having motors and valves controlled by a controller in response to communications received from a plurality of sensors. The vapor cycle system of the refrigeration system 300 includes a refrigerant circulation loop that includes the conventional components of a compressor 302, an air-cooled condenser 308, a condenser fan 310, a sub-cooler 316, an expansion valve 322, an evaporator 326, an evaporator fan 330, and a refrigerant heat exchanger 347. In addition, the refrigeration system 300 includes a liquid service block/sight glass 318 and a refrigerant filter & drier 320 in the refrigerant circulation loop between the sub-cooler 316 and the expansion valve 322.

The compressor 302, condenser 308, sub-cooler 316, sight glass 318, filter & driver 320, expansion valve 322, evaporator 326, and refrigerant heat exchanger 347 are connected by refrigerant tubing that contains refrigerant and facilitates the refrigerant moving between the vapor cycle system components over the course of the refrigeration cycle. The refrigerant is preferably one of R-134a, R404A, R236fa, and R1234yf, but may be any suitable refrigerant for a vapor cycle system known or developed in the art.

In operation, refrigerant enters the compressor 302 as low temperature, low pressure vapor. As refrigerant in vapor form is compressed in the compressor 302, the temperature and pressure of the refrigerant rise significantly such that the refrigerant may condense at ambient temperatures. Upon exiting the compressor 302, the refrigerant, in superheated vapor form, moves through the refrigerant tubing toward the condenser 308. Within the condenser 308, heat from the refrigerant is rejected and the refrigerant is condensed into a high pressure saturated liquid.

The condenser 308 is preferably air-cooled by use of condenser fan 310, which exhausts condenser air from the refrigeration system 300 and the enclosure 110. The enclosure 110 (or other enclosure enclosing the refrigeration system 300) may also include one or more condenser vents to facilitate a negative pressure created by the condenser fan 310 (e.g., the condenser fan 125 of FIGS. 1 and 2) to pull fresh air into the enclosure 110 for circulation to cool the condenser 308 (e.g., the condenser 115 of FIGS. 1 and 2). Upon exiting the condenser 308, the refrigerant passes through a high-temperature/high-pressure area of the refrigerant tubing.

The sub-cooler 316 may be disposed in the high-temperature/high-pressure portion of the refrigerant tubing after the output of the condenser 308 to sub-cool the refrigerant. The temperature of the refrigerant tubing in this region may be approximately 20-35 degrees F. above ambient temperature. The sub-cooler 316 may cool the hot refrigerant therein, effectively pre-cooling the refrigerant prior to entering the expansion valve 326 and increasing the effectiveness of the condenser. The sub-cooler 316 may include one or more thermoelectric devices (TED) coupled with a thermoelectric cold side fluid heat exchanger on one side and an air cooled thermoelectric hot side heat sink on the other side. The TED may be coupled with the thermoelectric cold side fluid heat exchanger and/or the air cooled thermoelectric hot side heat sink using a thermal interface material. The TED may function using principles of the Peltier Effect, in which a voltage or DC current is applied across two dissimilar conductors, thereby creating an electrical circuit which transfers heat in a direction of charge carrier movement. The direction of heat transfer through the TED is controlled by the voltage polarity across the TED.

When the sub-cooler 316 includes a TED, the sub-cooler 316 may receive the voltage or DC current from a TED power supply. The TED power supply may be controlled to turn the TED sub-cooler 316 on or off, or to set an operational value of the TED sub-cooler 316. For example, the TED power supply may use pulse width modulation under control of the controller to set an operational value of the TED sub-cooler 316.

The controller may control operation of the TED sub-cooler 316 according to a selected mode and temperature set point of the refrigeration system 300. The TED sub-cooler 316 may be controlled using an on/off voltage control waveform, a variable voltage control waveform, or a pulse width modulation (PWM) voltage control waveform. The TED sub-cooler 316 may be provided the controlled waveform by controlling the TED power supply to provide the desired controlled waveform to the TED sub-cooler 316.

After the sub-cooled refrigerant exits the sub-cooler 316, it preferably passes through a service block 318 including a sight glass and a filter/drier assembly 320. The filter and drier assembly 320 removes any moisture and solid contaminants from the refrigerant.

The refrigerant then passes through a refrigerant heat exchanger 347 for additional sub-cooling, in which heat is exchanged between the refrigerant liquid passing from the filter/drier assembly 320 to the expansion valve 322 and the refrigerant vapor passing from the evaporator 326 and the compressor 302. In particular, the refrigerant heat exchanger 347 performs a refrigerant liquid sub-cooling and refrigerant vapor superheating process by which the refrigerant passing from the filter/drier assembly 320 to the expansion valve 322 via the refrigerant heat exchanger 347 transfers heat to the refrigerant passing from the evaporator 326 to the compressor 302. By superheating the refrigerant before entering the compressor 302, droplets may be prevented from entering the compressor 302.

Following the refrigerant heat exchanger 347, the sub-cooled refrigerant then passes through an expansion valve 322. The expansion valve 322 drop the pressure of the refrigerant to a pressure corresponding to a user-selected operating state and temperature set-point of the refrigeration system 300. The expansion valve 322 also causes a sudden decrease in pressure of the liquid refrigerant, thereby causing flash evaporation of a portion of the liquid refrigerant.

The expansion valve 322 may include, for example, a block-type expansion valve with an internal sensing bulb. The expansion valve 322 may also be coupled with a thermal expansion remote bulb 324. The remote bulb 324 may be coupled with the expansion valve 322 by a capillary tube that communicates a working gas between the expansion valve 322 and the remote bulb 324 for sensing a temperature of the refrigerant leaving the evaporator 326. Thus, the expansion valve 322 may serve as a thermostatic expansion valve and operate to control a flow of refrigerant into the evaporator 326 according to the temperature of the refrigerant leaving the evaporator 326. After the cold liquid/vapor mixture exits the expansion valve 322, the refrigerant moves through the refrigerant tubing and enters the evaporator 326.

As the low temperature and low pressure refrigerant moves through the evaporator 326, the refrigerant absorbs the heat from the evaporator and lowers the temperature of the evaporator fins which then cool the air that circulate past the fins due to the operation of the evaporator fan 330. The cooled air circulated by the evaporator fan 330 becomes the chill air supply 334 that chills the interior of a compartment with which the refrigeration system 300 (e.g., refrigeration equipment 100 of FIGS. 1 and 2) is coupled. Warmed air may exit the interior of the compartment as return air 338 and the evaporator fan 330 (e.g., evaporator fan 160) then circulates the return air 338 through the evaporator fins (e.g., evaporator 150) to be cooled and once again become chill air supply 334. The evaporator 326 is preferably located adjacent the destination (e.g., a refrigerated food storage compartment in a food cart) for the chilled air exiting the evaporator (e.g., evaporator fan outlet 140) such that air ducts (e.g., evaporator air ducting 145) may efficiently route the chilled air supply 334 to the destination and route the return air 338 back from the destination.

The transfer of thermal energy between the return air 338 circulating past the evaporator fins and the refrigerant flowing within the evaporator 326 converts the liquid refrigerant to vapor, which is then compressed by the compressor 302 as the vapor cycle system continues operation.

When the warm return air 338 passes over the cold surface of the evaporator 326, moisture in the air condenses on the evaporator fins in the form of condensate. This condensate is drained from the refrigeration system by the condensate drain 328 and discarded.

When the refrigeration system 300 is placed in a defrost mode, a hot gas defrost valve 346 may be controlled to selectively route at least a portion of the hot vapor refrigerant directly from the output of the compressor 302 into an inlet of the evaporator 326 in order to defrost the evaporator fins of the evaporator 326. The hot gas defrost valve 346 may include a solenoid-controlled valve controlled by the controller 200.

The refrigeration system 300 includes a plurality of motors, sensors, and valve actuators in communication with a controller. Motors and associated electrical current sensors include a fan motor that turns the condenser fan 310, a fan current sensor 312 that measures an electrical current of the fan motor for the condenser fan 310, a fan motor that turns the evaporator fan 330, a fan current sensor 332 that measures an electrical current of the fan motor for the evaporator fan 330, a compressor motor that drives the compressor 302, and a compressor current sensor 304 that measures an electrical current of the compressor motor that drives the compressor 302.

Temperature sensors include sensors that monitor temperatures of airflow through the refrigeration system 300 in various locations. The temperature sensors may include a thermistor, a thermocouple, or any suitable device known in the art for measuring and reporting temperature. The temperature sensors of the refrigeration system 300 include, but are not limited to, a supply air temperature sensor 336 that measures a temperature of the chill air supply 334 that enters the compartment to be cooled, and a return air temperature sensor 340 that measures a temperature of the return air 338 that leaves the compartment to be cooled once again by the evaporator 326.

Another set of sensors monitor temperature and/or pressures of refrigerant circulating through the refrigeration system 300. The pressure sensors may include a pressure transducer, a pressure switch, or any suitable device known in the art for sensing fluid pressure. The pressure sensors of the refrigeration system 300 include a low side pressure switch 342 and a low side pressure transducer 344 that sense pressure of the refrigerant at an input to the compressor 302, a high side pressure transducer 306 that senses pressure of the refrigerant at an output of the compressor 302, and a high side pressure switch 314 that senses pressure of the refrigerant at an output of the condenser 308. The low side pressure switch 342 will turn off the refrigeration system 300 when the low side refrigerant pressure is below 10 psig, and the high side pressure switch 314 will turn off the refrigeration system 300 when the high side refrigerant pressure is above 325 psig.

The refrigeration system 300 may be used to pull down the temperature of the interior of the compartment by a much larger amount in a much shorter period of time than is normally required during steady state operation when the temperature of the compartment is typically already approximately the desired temperature set point, or at least much closer to the desired temperature set point than the ambient temperature. When the refrigeration system 300 is first operated, the heat load is typically larger than a steady state heat load. In addressing this large heat load, the sub-cooler 316 may be operated in conjunction with the rest of the vapor cycle system in order to pull down the temperature of the interior of the compartment as quickly as possible. The sub-cooler 316 increases the sub-cooling of the liquid refrigerant, thereby increasing the performance of the evaporator 326 in removing heat from the return air 338 and cooling the chilled air supply 334. Thus, the cooling capacity of the refrigeration system 300 is increased compared to operating the vapor cycle system alone, and the interior of the compartment can be cooled more quickly. Once the compartment reaches the target temperature set point, the sub-cooler 316 may be turned off and the vapor cycle system of the refrigeration system 300 may operate alone to address the steady state heat load of the compartment.

Figure 4:
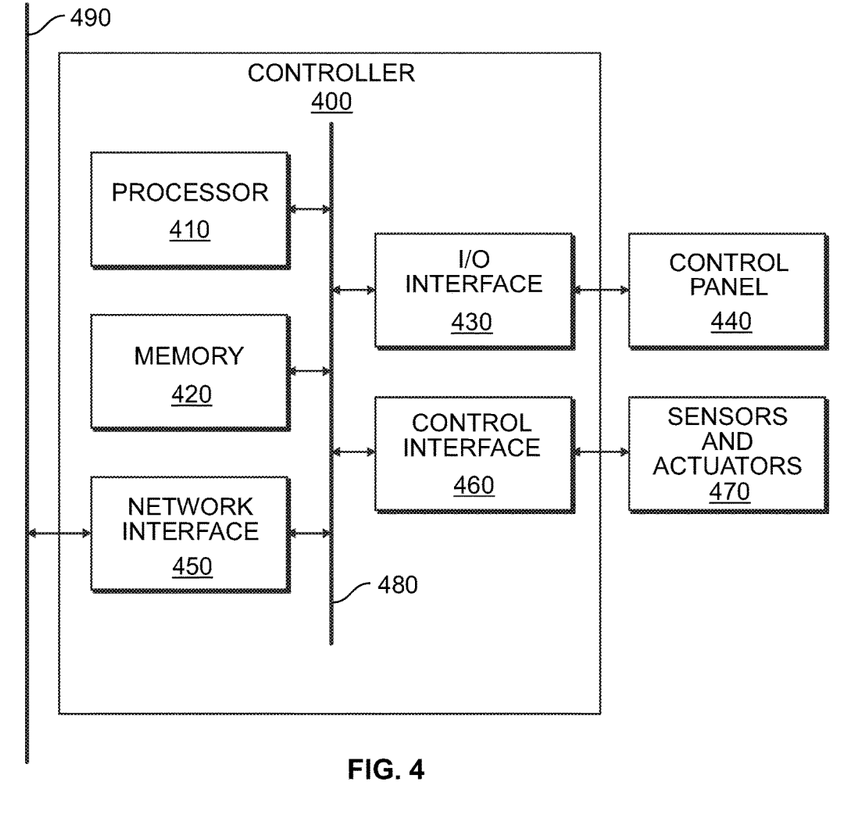
FIG. 4 is a block diagram of a controller for a refrigeration equipment or refrigeration system, according to an embodiment.

FIG. 4 is a block diagram of a controller 400 for a refrigeration equipment 100 or refrigeration system 300, according to an embodiment. The controller 400 may be coupled with a control panel 440 via an I/O interface 430. The controller 400 may be coupled with the refrigeration system 300. The controller 400 may receive input commands from a user via input devices, such as turning the refrigeration system on or off, selecting an operation mode, and setting a desired temperature of the refrigerated compartment. The controller 400 may output information to the user regarding an operational status (e.g., operational mode, activation of a defrost cycle, shut-off due to over-temperature conditions of the refrigerated compartment and/or components of the refrigeration system 300, etc.) of the refrigeration system using a display panel. The controller 400 may be coupled with the input devices and the display panel using shielded and twisted cables, and may communicate with the input devices and/or the display panel using an RS-232 communication protocol due to its electrically robust characteristics. Similar display panels and input devices may also be present in embodiments of refrigeration equipment, air chillers, and refrigerators with which the controller 400 may be coupled. Alternatively, similar display panels and input devices may be installed remotely from embodiments of the refrigeration equipment, air chillers, and refrigerators with which the controller 400 may be coupled.

The controller 400 may include a processor 410 that performs computations according to program instructions, a memory 420 that stores the computing instructions and other data used or generated by the processor 410, and a network interface 450 that includes data communications circuitry for interfacing to a data communications network 490 such as Ethernet, Galley Data Bus (GAN), or Controller Area Network (CAN). The processor 410 may include a microprocessor, a Field Programmable Gate Array, an Application Specific Integrated Circuit, or a custom Very Large Scale Integrated circuit chip, or other electronic circuitry that performs a control function. The processor 410 may also include a state machine. The controller 400 may also include one or more electronic circuits and printed circuit boards.

The processor 410, memory 420, and network interface 450 may be coupled with one another using one or more data buses 480. The controller 400 may communicate with and control various sensors and actuators 470 of the refrigeration system 300 via a control interface 460.

The controller 400 may be configured on or with an aluminum chassis or sheet metal box, which may be grounded and largely opaque to high-frequency energy transmission. Wires which carry high voltage and/or high frequency signals into or out of the refrigeration system 300 may be twisted and/or shielded to reduce RF radiation, susceptibility, and EMI. Low frequency and low-voltage carrying wires may typically be filtered at the printed circuit board of the controller to bypass any high-frequency noise to ground.

The controller 400 may be controlled by or communicate with a centralized computing system, such as one onboard an aircraft. The controller 400 may implement a compliant ARINC 812 logical communication interface on a compliant ARINC 810 physical interface. The controller 400 may communicate via the Galley Data Bus (e.g., galley networked GAN bus), and exchange data with a Galley Network Controller (e.g., Master GAIN Control Unit as described in the ARINC 812 specification). In accordance with the ARINC 812 specification, the controller 400 may provide network monitoring, power control, remote operation, failure monitoring, and data transfer functions. The controller 400 may implement menu definitions requests received from the Galley Network Controller (GNC) for presentation on a GNC Touchpanel display device and process associated button push events to respond appropriately. The controller 400 may provide additional communications using an RS-232 communications interface and/or an infrared data port, such as communications with a personal computer (PC) or a personal digital assistant (PDA). Such additional communications may include real-time monitoring of operations of the refrigeration system 300, long-term data retrieval, and control system software upgrades. In addition, the control interface 460 may include a serial peripheral interface (SPI) bus that may be used to communicate between the controller 400 and motor controllers within the refrigeration system 300.

The refrigeration system 300 may be configured to refrigerate beverages and/or food products which are placed in a chilled or refrigerated compartment with which the refrigeration system 300 is operatively attached. The refrigeration system 300 may operate in one or more of several modes, including refrigeration, beverage chilling, and freezing. A user may select a desired temperature for the refrigerated compartment using the control panel 440. The controller 400 included with the refrigeration system 300 may control a temperature within the refrigerated compartment at a high level of precision according to the desired temperature. Therefore, quality of food stored within the refrigerated compartment may be maintained according to the user-selected operational mode of the refrigeration system 300.

In various embodiments, the refrigeration system 300 may maintain a temperature inside the refrigerated compartment according to a user-selectable option among several preprogrammed temperatures, or according to a specific user-input temperature. For example, a beverage chiller mode may maintain the temperature inside the refrigerated compartment at a user-selectable temperature of approximately 9° C., 12° C., or 16° C. In a refrigerator mode, the temperature inside the refrigerated compartment may be maintained at a user-selectable temperature of approximately 4° C. or 7° C. In a freezer mode, the temperature inside the refrigerated compartment may be maintained at a user-selectable temperature of approximately −18° C. to 0° C.

The controller 400 may poll the sensors at a fixed minimum rate such that all data required to control the performance of the refrigeration system 300 may be obtained by the controller 400 in time for real-time operation of the one or more cooling systems within the refrigeration system 300. The polled values may be reported by the controller 400 via the RS-232 or infrared interface to a personal computer or PDA and may be reported over a controller area network (CAN) bus. The polled values may also be used in control algorithms by the controller 400, and may be stored to long-term memory or a data storage medium for later retrieval and analysis.

The controller 400 may provide a self-protection scheme to protect against damage to the refrigeration system 300 and its constituent components due to abnormal external and/or internal events such as over-temperature conditions, over-pressure conditions, over-current conditions, etc. and shut down the refrigeration system 300 and/or one or more of its constituent components in accordance with the abnormal event. The self-protection scheme may include monitoring critical system sensors and taking appropriate self-protection action when monitored data from the sensors indicate a problem requiring activation of a self-protection action. Such a self-protection action may prevent the refrigeration system 300 and/or its constituent components from being damaged or causing an unsafe condition. The self-protection action may also provide appropriate notification via a display panel regarding the monitored problem, the self-protection action, and/or any associated maintenance required. The controller's self-protection scheme may supplement, rather than replace, mechanical protection devices which may also be deployed within the refrigeration system 300. The controller 400 may use monitored data from the sensors to intelligently restart the refrigeration system 300 and reactivate the desired operational mode after the abnormal event which triggered the self-protection shutdown has terminated or reduced in severity.

The refrigeration system 300 may be controlled by an electronic control system associated with the controller 400. The memory 420 of the controller 400 may store a program for performing a method of controlling the refrigeration system 300 executable by the processor 410. The method of controlling the refrigeration system 300 performed by the electronic control system may include a feedback control system such that the refrigeration system 300 may automatically maintain a prescribed temperature in a food and beverage storage compartment with which the refrigeration system 300 is coupled.

Figure 5:
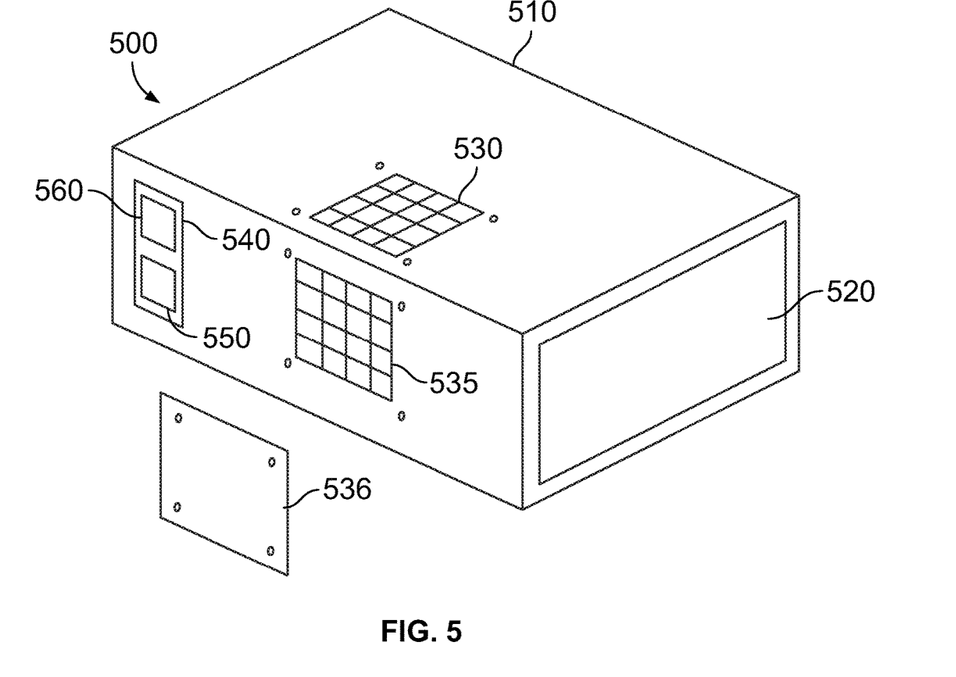
FIG. 5 illustrates a perspective view of an aircraft galley refrigeration equipment, according to an embodiment.

FIG. 5 illustrates a perspective view of an aircraft galley refrigeration equipment 500, according to an embodiment. The aircraft galley refrigeration equipment 500 may be a line replaceable unit (LRU), and may provide refrigeration functionality while the aircraft is both on the ground and in flight. The refrigeration may be provided using a cooling system as illustrated in FIGS. 1-4. The refrigeration equipment 500 may be designed according to an ARINC 810 standard. The refrigeration equipment 500 may be configured to operate using an electrical power source such as three phase 115 or 200 volts frequency alternating current (AC) at a frequency of 360 to 900 Hz. The refrigeration equipment 500 may employ AC to DC power conversion to provide a predictable and consistent power source to motors and/or valve actuators. The refrigeration equipment 500 may also include a polyphase transformer (e.g., a 15-pulse transformer) to reduce current harmonics reflected from the refrigeration equipment 500 back into an airframe power distribution system with which the refrigeration equipment 500 may be coupled.

The refrigeration equipment 500 may include an enclosure 510 (e.g., a chassis) having a condenser air inlet 520, and air discharge ports 530 and 535. The condenser air inlet 520 may include an air filter and attachment device (not shown). The enclosure 510 may be grounded to provide a Faraday shield to help shield the refrigeration equipment 500 from external electromagnetic interference (EMI) influences while containing internally generated high-frequency energy. Various embodiments of the refrigeration equipment 500 may also include an EMI filter to reduce susceptibility to conducted EMI and emissions of EMI. The enclosure 510 may also include mounting rails, a removable air filter, a bezel, and wheels. The air discharge port 530 is designed for top outlet air duct option, and the air discharge port 535 is designed for side outlet air duct option. The air outlet cover 536 with four screws is used to cover one of the discharge ports 530 or 535 if only a single discharge port is to be used during the operation of the refrigeration equipment 500.

The refrigeration equipment 500 may also include a control panel 540 having one or more input devices (e.g., control buttons or switches) 550, and a display panel (e.g., an LCD display or LED's) 560. The display panel 560 may provide a user interface display. The display panel 560 may be mounted on a grounded backplane to reduce RF emissions. An Indium Tin Oxide (ITO) on-polymer layer may be employed behind a display glass of the display panel 560 to block or reduce RF energy radiation.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of providing chilled air in response to a start-up demand for chilled air comprising:

providing an aircraft galley refrigeration system including an enclosure, a compressor, a condenser, a condenser fan, a condenser fan motor, a condenser fan shroud, a refrigeration equipment air outlet, an evaporator, an evaporator fan, an evaporator fan motor, an evaporator fan shroud, evaporator air ducting, an evaporator fan outlet, and tubing to circulate refrigerant through the refrigeration system from the compressor, to the condenser, to the evaporator, and back to the compressor, wherein the refrigeration equipment air outlet is positioned on a top of the enclosure and the evaporator fan outlet is positioned on a bottom of the enclosure, wherein the aircraft galley refrigeration system is implemented as or includes a line replaceable unit (LRU), wherein the evaporator fan motor and the condenser fan motor are separately controlled;

on reception of the start-up demand, powering up the compressor to compress vapor from the refrigerant and the condenser fan motor to provide cooling to the condenser to cool while leaving the evaporator fan turned off to reduce warm air recirculation from the evaporator, wherein the condenser fan pulls airflow through the condenser, the condenser fan shroud, and an interior of the enclosure and exhausts the airflow out of the refrigeration equipment air outlet; and when the cooled compressed liquid coolant enters the evaporator as determined by a controller in response to a temperature of the cooled compressed liquid coolant measured by a sensor, powering up the evaporator fan to cause a flow of air from the evaporator fan through the evaporator fan shroud to the evaporator and to provide chilled air through the evaporator air ducting and out of the evaporator fan outlet, wherein the enclosure is grounded to provide a Faraday shield to shield enclosed components of the aircraft galley refrigeration system from external electromagnetic interference (EMI) influences, wherein the aircraft galley refrigeration system further includes a display panel mounted on the enclosure, wherein the display panel provides a user interface;

wherein the aircraft galley refrigeration system further includes a sub-cooler.

2. The method of claim 1 in which when the demand for chilled air terminates, the power to the evaporator fan and compressor are cut off, but the condenser fan continues to be powered for a sufficient period to provide compressor overheat protection.

3. The method of claim 1 in which the evaporator fan motor is located outside of the evaporator and spaced away from an evaporator intake.

4. The method of claim 3 in which the evaporator fan motor is spaced away from the evaporator fan by an evaporator fan drive chosen from the group consisting of: a fan belt, a drive shaft, and a gear drive.

5. The method of claim 3 in which the evaporator fan motor is spaced away from the evaporator fan by an evaporator fan drive comprising a fan belt.

6. The method of claim 3 in which the evaporator fan motor is spaced away from the evaporator fan by an evaporator fan drive comprising a gear drive.

7. The method of claim 1 including air ducting at an outlet of the evaporator to transport chilled air from the evaporator.

8. The method of claim 1 in which the evaporator fan is positioned at an inlet of the evaporator.

* * * * *